United States Patent
Butzloff et al.

(10) Patent No.: US 8,262,836 B2
(45) Date of Patent: Sep. 11, 2012

(54) WELDING OF BIODEGRADABLE POLYMER PARTS

(75) Inventors: Peter Butzloff, Bristol, NH (US); Robert Berger, Huntington Beach, CA (US); Jamie Antongiovanni, Huntington Beach, CA (US)

(73) Assignee: GraphicPak Corporation, Sunset Beach, CA (US)

( * ) Notice: Subject to any disclaimer, the term of this patent is extended or adjusted under 35 U.S.C. 154(b) by 29 days.

(21) Appl. No.: 12/877,791

(22) Filed: Sep. 8, 2010

(65) Prior Publication Data

US 2011/0059284 A1    Mar. 10, 2011

Related U.S. Application Data

(60) Provisional application No. 61/240,585, filed on Sep. 8, 2009.

(51) Int. Cl.
*B32B 1/04*    (2006.01)

(52) U.S. Cl. .................................................. 156/272.2

(58) Field of Classification Search ............... 156/272.2, 156/273.7, 275.1
See application file for complete search history.

(56) References Cited

U.S. PATENT DOCUMENTS

| | | | |
|---|---|---|---|
| 4,787,194 A * | 11/1988 | Lancaster et al. | 53/469 |
| 5,338,611 A | 8/1994 | Lause et al. | |
| 2003/0124258 A1 * | 7/2003 | Benim et al. | 427/365 |
| 2003/0188819 A1 * | 10/2003 | Campbell et al. | 156/73.1 |
| 2007/0125489 A1 | 6/2007 | Paul et al. | |
| 2009/0004460 A1 * | 1/2009 | Gruber et al. | 428/323 |

FOREIGN PATENT DOCUMENTS

| | | |
|---|---|---|
| JP | 05-042548 A | 2/1993 |
| JP | 2000516164 A | 12/2000 |
| WO | WO-9807555 A1 | 2/1998 |

OTHER PUBLICATIONS

PCT International Search Report dated Jun. 29, 2011, issued in connection with counterpart PCT application No. PCT/US2010/048137.

* cited by examiner

*Primary Examiner* — Daniel McNally
(74) *Attorney, Agent, or Firm* — Carl A. Kukkonen, III; Mintz, Levin, Cohn, Ferris, Glovsky and Popeo, P.C.

(57) ABSTRACT

A microwave processing device/system can create strong temperature gradients in biodegradable polymer material. Novel physical phenomena caused by the heated particles cause local changes in viscosity and flow, leading to high mass transport and current densities in activated polymer matrix materials and to dramatically shorter reaction times and solvent-free reaction conditions. Advancements in the process speed and quality of packaging films in general can be achieved by increasing the polymeric amorphous to crystalline ratio, especially with regard to the claimed methods for manufacturing and sealing biodegradable packaging films. Micron-size particles or nanoparticles in the processed materials can interact with microwaves of different frequencies and intensities to create intentionally varied local material property changes to create an tunable flexible packaging product that is sustainable and "green." Related systems, apparatus, methods, and/or articles are also described.

9 Claims, 6 Drawing Sheets

WELDING OF BIODEGRADABLE POLYMER PARTS

CROSS-REFERENCE TO RELATED APPLICATION

This application claims priority under 35 U.S.C. §119(e) to provisional application No. 61/240,585 filed on Sep. 8, 2009 and entitled "Welding of Biodegradable Polymer Parts," the disclosure of which is incorporated herein in its entirety.

TECHNICAL FIELD

The subject matter described herein relates to assembly of containers and packaging, such as biodegradable containers, for example by welding together one or more parts having different thermal, chemical, and/or mechanical properties.

BACKGROUND

The manufacture of certain types of disposable plastic containers generally involves welding one or more preformed polymer components together. For example, a pouch and fitment assembly similar to those shown in FIG. 1 can be assembled from two sheets of a flexible polymer material that are fused or welded together around their periphery to form a pouch and a plastic fitment that is joined to the pouch, either at an end, at a corner, or on one face of the pouch. The terms "fusing" and "welding" as used herein refer to any process by which a sealed connection is formed between two polymer components.

A fitment can include a reusable cap, for example a screw cap, for opening and then resealing the pouch or can alternatively be closed with a one-time seal that a user breaks to access the pouch contents. The term "fitment" as used herein is intended to refer broadly to one or more of a spout, valve, handle, dispenser, cap or other rigid feature that is physically sealed or built into a liner, bag, pouch, or other packaging container. A fitment can be formed from one or more pieces that can be movable relative to each other and/or to the packaging container to which the fitment is attached. Other openings can be provided for accessing or dispensing the contents of a packaging container, such as for example a foil patch or other orifice that can be punctured with a straw or a removable portion of the packaging container that can be ripped off or removed via a tear cord. Heat sealing, ultrasonic welding, or other comparable techniques can be used to seal the flexible polymer to itself and to the fitment.

SUMMARY

In a first aspect, a method includes applying pressure to bring a first weld location on a first polymer piece into abutment with a second weld location on a second polymer piece. The first weld location has first dielectric properties, and the second weld location has second dielectric properties. Microwave energy is delivered to the first weld location and the second weld location in a controlled manner to promote a first microwave absorbance in the first weld location that is governed by the first dielectric properties and a second microwave absorbance in the second weld location that is governed by the second dielectric properties. The first microwave absorbance generates a first melt-flow condition in the first weld location that is compatible with a second melt-flow condition generated in the second weld location by the second microwave absorbance. A welded seam is created that joins the first weld region to the second weld region.

In a second aspect, an article of manufacture includes a first polymer piece that includes a first weld location having first dielectric properties, a second polymer piece that includes a second weld location having second dielectric properties, and a thermal welded seam that joins the first weld location to the second weld location. The thermal weld is created by bringing the first weld location into abutment with the second weld location and delivering microwave energy to the first weld location and the second weld location in a controlled manner to promote a first microwave absorbance in the first weld location that is governed by the first dielectric properties and a second microwave absorbance in the second weld location that, is governed by the second dielectric properties. The first microwave absorbance generates a first melt-flow condition in the first weld location that is compatible with a second melt-flow condition generated in the second weld location by the second microwave absorbance.

In optional variations, one or more of the following additional features can be included. The first weld location can be prepared by adding one or more first additives that selectively affect the first dielectric properties. The one or more first additives can include particles of a first particle size having a first composition and present in a first concentration. The first particle size, the first composition, and the first concentration can be selected to impart the first weld location with similar microwave radiation absorbance properties to the second weld location. The one or more first additives can include hematite, iron carbide, other carbides, or nanoparticles. An ordered orientation can be imposed on nanoparticle additives in the first weld region, and the microwave energy can be delivered with a polarization that is preferentially absorbed by the nanoparticles in the ordered orientation. The imposing of the ordered orientation of the nanoparticles in the first weld region can be performed by one or more of a melt-flow process, a drawing process, and a chemical process. The one or more first additives can include one or more ionomeric materials. The second weld location on the second polymer piece can also be prepared by adding one or more second additives that selectively affect the second dielectric properties. The first additive can include particles of a first particle size having a first composition and present in a first concentration; the second additive can include particles of a second particle size having a second composition and present in a second concentration; and the first and second particle sizes, the first and second compositions, and the first and second concentrations can be selected to impart the first weld location and the second weld location with similar microwave radiation absorbance properties. The first polymer piece can include a flexible film and the second polymer piece can include a molded device. The molded device can be a fitment and the flexible film can form a sealed pouch to which the fitment is attached to provide access to contents stored within the pouch. The first polymer piece can include biodegradable poly-lactic acid (PLA).

Ultrasonic energy can be applied to the first and the second weld regions to enhance the creating of the welded seam. The delivering of microwave energy to the first weld location and the second weld location can include applying a heterogeneous microwave field that is more strongly absorbed in the first weld region than in the second weld region. The delivering of microwave energy to the first weld location and the second weld location can include sequentially applying a microwave field having at least a first frequency and a second frequency. The first frequency can be more strongly absorbed in the first weld region and the second frequency can be more strongly absorbed in the second weld region.

The subject matter described herein provides many advantages. For example, various aspects are disclosed pertaining to packaging products that incorporate both flexible films and molded object components that are compostable and biodegradable. Such packaging products can include a cost-effective biodegradable pouch and fitment combination that can be produced using an improved manufacturing process that reduces materials, costs, and manufacturing time. Other advantages that can be provided by one or more implementations of the currently disclosed subject matter include, but are not limited to, creating stronger welds, both between two pieces of biodegradable flexible film and between a piece of biodegradable flexible film and a molded fitment or other bulk feature; lower overall energy consumption required to create such welds; and the ability to use biodegradable polymer materials for all components of a packaging assembly.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the detailed description that follows, illustrate and explain some of the principles, structures, features, and/or advantages associated with one or more implementations of the disclosed subject matter. Wherever possible, similar reference numerals in the drawings are used to denote identical or similar structures or other features of the described subject matter. In the drawings.

To the extent possible, similar reference numbers denote similar features in the drawings.

DETAILED DESCRIPTION

Figure 1:
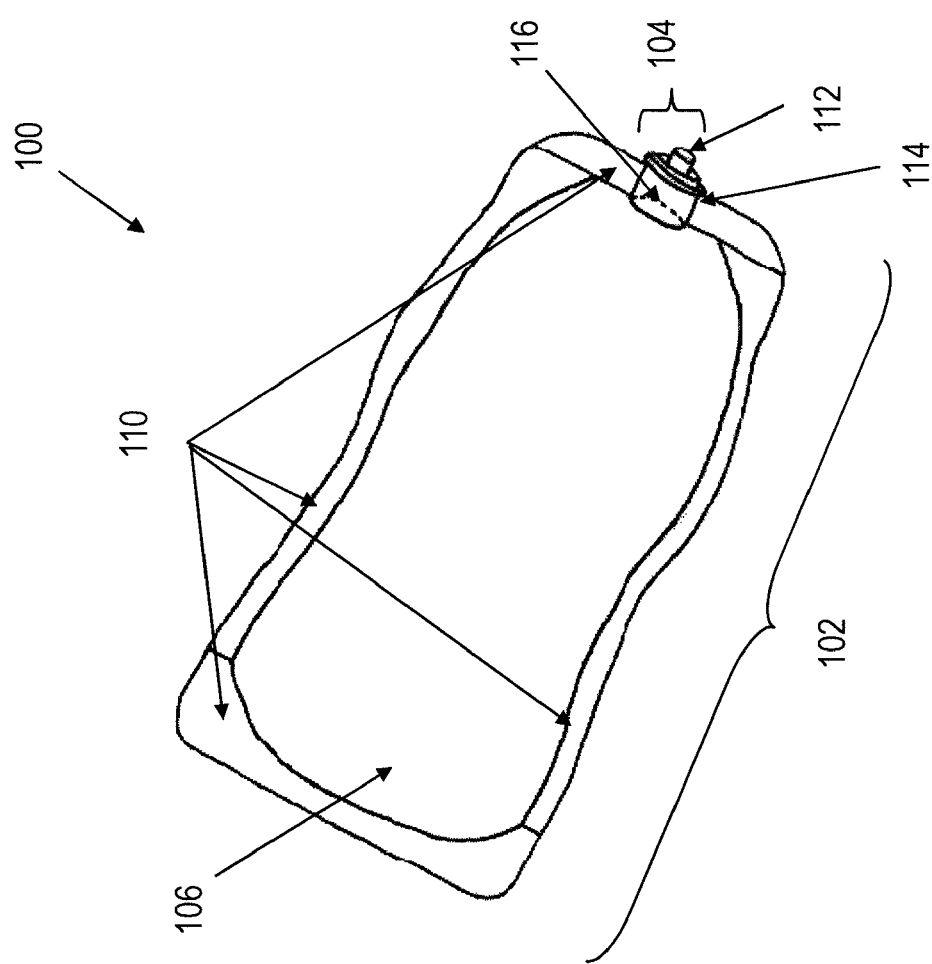
FIG. 1 is a diagram showing an example of a packaging container including a pouch and fitment that are formed from a combination of polymer film components and a fitment.

The use of biodegradable materials in plastic packing continues to increase due to environmental and waste disposal concerns. Biodegradable fitments can be manufactured using injection thermoplastics and resin and molded objects. Multilayer flexible films can also be manufactured using biodegradable polymers and can provide short-term liquid and gas-phase barrier properties while also preserving long term biodegradation ability. However, currently available biodegradable components of plastic containers are not fully compatible for integrated use. Both flexible film and molded object technologies can create packaging with similar biodegradability attributes. However, the properties and formulations of the materials used in flexible films and in bulkier molded objects such as fitments differ substantially in their chemical, mechanical, and thermal properties. These differences have a substantial negative impact on the economics and reproducibility of processes to create long term hermetic seals on containers in which the two types of materials must be sealed to one another. A typical workaround to this issue is to manufacture packaging products in which only some of the packaging components are biodegradable.

Properties of amorphous laminate polymer films typically differ quite significantly from the properties of melt-crystallized laminate polymer films. In semi-crystalline biopolymers, defects at particle interfaces can manifest during deformation of a polymer film as cracks at macroscopic strains below the strain to failure of the polymer. A different interface structure can result from different heat treatments. Additionally, unmodified biopolymers used for packaging applications can suffer from disadvantages such as brittleness resulting in poor impact and tear resistance, low melt strength, and low heat deflection temperature. Unmodified starch-based polymers have relatively good melt strength, but can be brittle.

Additives can be used to modified the biopolymer to overcome these difficulties, for instance by improving impact toughness of amorphous and semi-crystalline biopolymers like PLA. Reducing brittleness can also be important both for end-use and for manufacturing, for example because brittleness-induced breaks during thermoforming can potentially lead to for small, shattered pieces of a formed sheet structure contaminating the packaging. While the use of additives can improve the bulk properties of the biopolymer, they can also create differing chemistries at additive and biopolymer interfaces. Ordering of polymer chains near additive particles in the biopolymer can result in a reduction of the bonding sites between the polymer chains and any added particles, causing a weakening of the polymer to particle reinforcement. This can be a significant cause of delamination of films and seals made with biodegradable nanocomposites in uniaxial tensile tests with melt-crystallized laminate films. Furthermore, an interface with differing chemistry between the two parts being joined or welded generally is more likely to delaminate (for example peel apart) or fail to produce a good seal. In short, prior uses of additives in biopolymer packaging have encountered problems with either or both of increased brittleness and delamination across welded or sealed interfaces.

The current subject matter addresses this problem using additives that reduce brittleness in conjunction with techniques that provide good seals across a weld or join interface between two biopolymer elements. Manufacturing techniques, articles of manufacture, methods of using, and the like are disclosed pertaining to biodegradable disposable containers. Currently employed biodegradable materials are employed. However, the sealing process is improved relative to conventional joining and sealing methods by the use of microwave sealing, either alone or in conjunction with one or more conventional sealing methods, for example by desirably limiting the premature breakdown of biopolymers during processing, shaping, welding, or sealing operations in two ways. First, microwaves can limit melt-flow to target dipolar regions or absorbing regions of the molecular structure, thereby avoiding exposure to excess heat and limiting subsequent thermal degradation to other parts of the biopolymer by not heating those regions that do not require heat to allow processing. Secondly, microwaves can act to substantially limit the overall melt-flow process time at elevated temperature in a concerted manner when the microwave irradiation ceases, thereby avoiding thermal degradation which is the undesirable breakdown of the biopolymer during processing. Additives embedded in the polymer matrix of one or more of the pieces that are joined to form the container cause heterogeneous absorption of the microwave energy at a joining site to create a hermetic seal.

Figure 2:
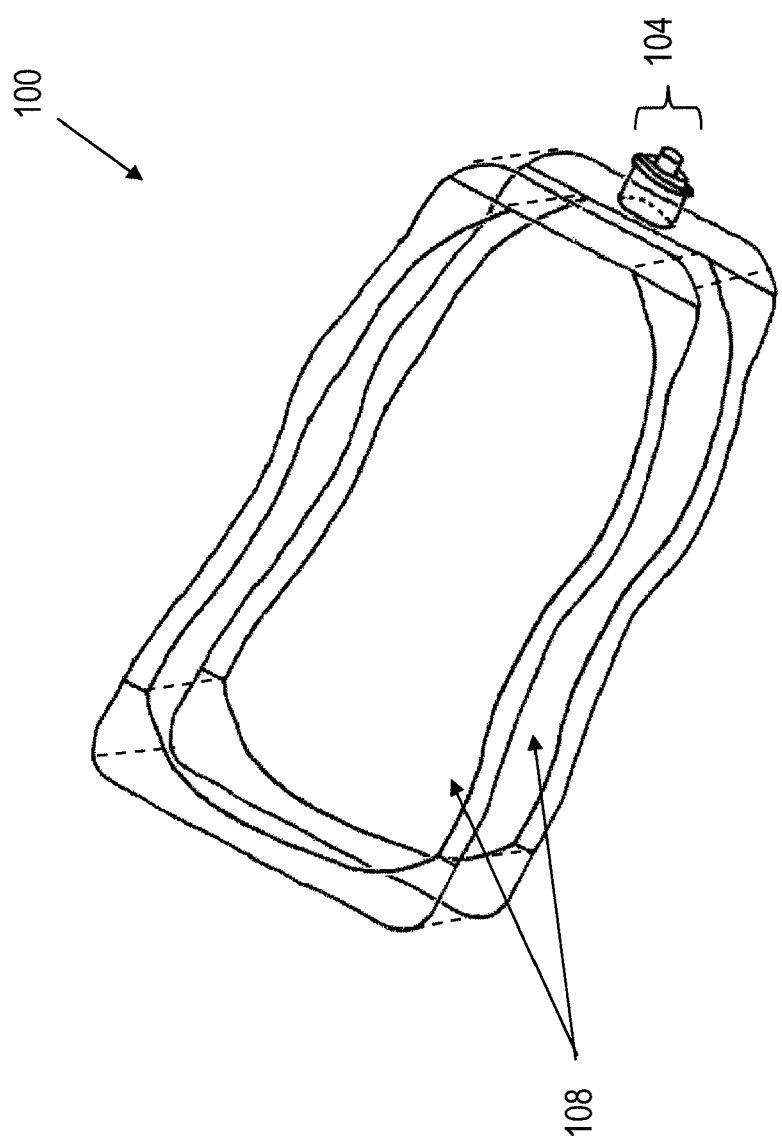
FIG. 2 is an exploded diagram showing an example of a packaging container including a pouch and fitment that are formed from a combination of polymer film components and a fitment.

FIG. 1 is a schematic diagram showing an example of one type of packaging container 100 that can be assembled using the currently disclosed subject matter. FIG. 2 shows an exploded view of a similar packaging container 100 prior to assembly. The assembled packaging container 100 includes a pouch 102 with an internal volume 106 that can contain a product, such as for example water; a beverage; condiments; other liquid or dry foodstuffs; liquid, gas-phase, or solid consumer products; and the like. A fitment 104 is also included to allow removal of the product without tearing the walls of the pouch 102. The pouch 102 can be formed from one or more pieces of polymer film 108. In the example of FIG. 1 and FIG. 2, two facing pieces of polymer film 108 are aligned and fused together via polymer welds 110 around the periphery of the internal volume 106. The fitment 104 can be formed by a number of processes such as injection molding or the like and can include an opening or port 112 via which the product can pass from the internal volume 106. The fitment can also include a neck area 114 that is adhered or fused to the polymer film material forming the pouch via a weld 116 around the circumference of the neck 114 so as to provide a strong, hermetic seal that prevents leaks and, if applicable, preserves freshness of the product within the internal volume 106. As described in greater detail below, the welds 110 can be formed in pre-defined areas 120, which in some implementations can be selectively embedded with micron- or nano-scale particles or other additives that can enhance absorption of microwave energy at the weld sites. The embedded particles or additives can also be specifically selected and/or treated to affect microwave energy absorption by the two polymer components being welded to provide substantially similar compatible melt-flow conditions on both sides of the weld. This approach can generate substantial improvements over existing polymer welding techniques in speed of processing, strength and reproducibility of the weld, and/or in reduced materials demand.

While the subject matter disclosed herein will generally be described in reference to a pouch and fitment type packaging container such as is shown in FIG. 1 and FIG. 2, it should be understood that the disclosed techniques, processes, article of manufacture, systems, and apparatus that are described are generally applicable to any kind of packaging material in which one or more polymer components, be they biodegradable or non-biodegradable, are welded together. In other non-limiting examples, a pouch having more than two sides can be formed of flexible polymer films welded together along their edges and can have more than one fitment or other molded polymer component. Additionally, a packaging container could have a wall or walls formed of flexible polymer film supported on a rigid framework of molded polymer. The current subject matter can be used in creating strong, reproducible, hermetically sealed welds between a wide variety of polymer material. In addition to a valve-type fitment such as is shown in FIG. 1 and FIG. 2, other types of parts can be included in the packaging containers or structures according to the current subject matter, such as for example fixtures, handles, interlocks, caps, spouts, seams, and the like.

A variety of biodegradable materials can be used in the construction of a packaging container 100 consistent with the current subject matter. One example is polylactic acid or polylactide (PLA), a biodegradable, thermoplastic, aliphatic polyester derived from renewable resources, for example corn starch, sugarcane, and the like. While some of the illustrative examples discussed below are presented using PLA as the biodegradable polymer, it should be understood that any other commercial biodegradable material can be used as the substrate for flexible films used in the disclosed containers. PLA and other biodegradable polymers experience a degradation in strain properties due to crystallite formation that occurs when these materials are subjected to radiation. Under such conditions, natural crystals form from the melt, or by the introduction of any particle that acts as a "seed" surface from which crystals can grow. With crystalline properties, the biodegradable polymer tends to lack the ability to be drawn, deformed, and effectively worked to create a desired shape with the necessary physical and chemical characteristics. Defects at particle interfaces can manifest as cracks or as macroscopic strains even below the failure point of the polymer material.

Some implementations of the current subject matter employ microwave radiation to process the flexible film and create welds, for example hermetic seals 110 and 116, both in the making of a pouch 102, if one is included in the packaging, and, if applicable, in fusing, welding, or otherwise fixable coupling one or more molded biodegradable plastic pieces 104 in place to the flexible film so that a hermetic seal is achieved. Use of microwaves allows the package 100 and contents to remain aseptic during any and all steps of the packaging operation from filming and forming, to hermetically sealing and filling. The current subject matter purposefully employs heterogeneous absorption of microwave energy by biodegradable polymer packaging to selectively target locations on the packaging where heat welding of component parts of the packaging is desired. Efficient and effective thin film processing, hermetic sealing, and fitment welding are possible with this approach which also allows local and customized transformation of materials and substrates. This approach is beneficial in particular to polymer near to the surface of embedded nanoparticles which have a high surface area and high microwave absorption cross-section.

Figure 3:
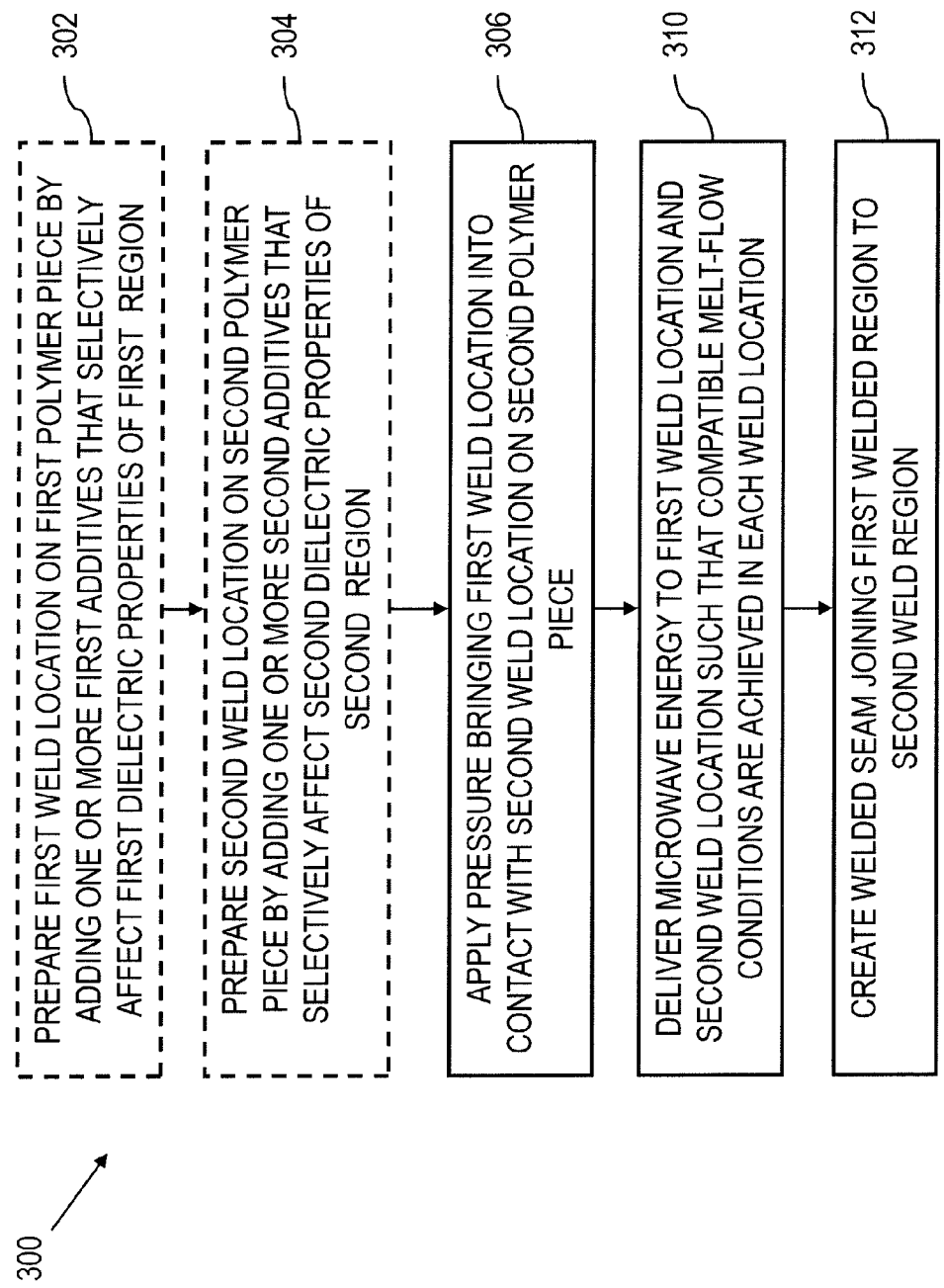
FIG. 3 is a process flow diagram illustrating a method for assembling a container from biodegradable polymer materials.

At least some advantages of the current subject matter can be realized using the method shown in the process flow chart 300 of FIG. 3. At 302, a first weld location on a first piece of polymer material is optionally prepared for welding by adding one or more first additives. Also optionally, at 304, a second weld location on a second piece of polymer material is prepared for welding by adding one or more second additives. The first weld region has first dielectric properties, and the second weld region has second dielectric properties. If the first or second additives are added to the first or second weld regions, these additives can selectively affect the first and/or second dielectric properties. The first and the second additives can be the same or different. The first weld location is brought into contact with the second weld location on a second polymer piece and pressure is applied at 306. At 310, microwave energy is applied to the first and second weld locations in a controlled manner to promote a first microwave absorbance in the first weld location that is governed by the first dielectric properties and a second microwave absorbance in the second weld location that is governed by the second dielectric properties. The first microwave absorbance generates a first melt-flow condition in the first weld location that is compatible with a second melt-flow condition generated in the second weld location by the second microwave absorbance. At 312 a welded seam joining the first weld region to the second weld region is created.

In some implementations of the current subject matter, the first and/or the second additives can be micron- or nano-scale particles. The particles can, in some non-limiting examples, include hematite, iron carbide or other carbides. Addition of small particles can increase the strain modulus of a biodegradable polymer after and during processing with microwave energy. The particles typically have substantially larger microwave cross-sections than the polymer material itself. Thus, the particles absorb radiation during microwave sealing to thereby selectively heat the biodegradable polymer at or near the weld regions, which are the regions on each of the polymer pieces being welded that are brought into abutment with one another and fixably coupled according to the current subject matter. Additionally, crystals of the biodegradable polymer that lie in contact with or closely adjacent to the embedded particles can be melted locally. This local melting allows the material at the newly formed seam to rapidly form in a substantially solid state, which leads to better sealing characteristics. Similarly, use of such particles in a molded bulk piece such as a fitment can quickly and efficiently promote high melt-flow conditions at the joining interface.

Embedded particles as described above can absorb much of the microwave irradiation cross-section. This absorption focuses the microwave field and therefore the creation of heat into a small reaction volume near to the surface of those particles, so that significantly enhanced chemical cross-linking takes place around and on the in situ particle surfaces. At the same time, significantly high melt-flow is achieved in very short times and on molecular scales. These material and processes advancements translate into faster mass production speeds, finer and better reaction sealing control, and economic savings from energy conservation due to the ability to heat or activate only those regions desired inside the material without waiting for heat transmission through typical polymeric materials of otherwise notably poor direct contact thermal conduction.

In implementations where two similar pieces of polymer material are welded, the first and the second additives can be similar or even identical. When a weld is to be formed between polymer pieces with different properties, such as for example between a piece of polymer film and a molded piece having substantial mass and thermal bulk, such as a molded plastic fitment, the first and the second additives can differ. The size, composition, and/or density of the additives in the to-be-welded piece having greater thermal mass can be chosen to have a greater microwave cross-section and/or to increase overall microwave energy absorption. In this manner, the localized heating in both the first weld region and the second weld region can be more closely matched so that similar levels of melt-flow occur on either side of the formed weld or seam. A stronger, more reliable and durable seam is thereby produced.

In optional implementations, an ionomer or a class of ionomeric materials may be added to the biodegradable polymer prior to creating a seam or weld. Ionomer molecules, such as for example those of the Surlyn™ family of ionomers (DuPont) are naturally compatible with nanoparticles due to their ability to reorient themselves with electrostatic charges that are either fixed or generated by microwaves at the particle surfaces. This can result in a self-healing polymer in cases in which the biodegradable polymer is co-polymerized with the ionomer. Additional benefits can include but are not limited to improvements in biodegradability as well as improved microwave heat sealing ability. In addition, punctures and rips in the film/sheet can become self-healing. This can also facilitate the manufacturing process as defects in the hermetic seal can self-correct. Moreover, ionic liquids are outstanding microwave-absorbing agents owing to their high ionic conductivity and polarizability, thus leading to a high heating rate and a considerably shortened melt-flow process and reaction time.

In some optional variations, the embedded micron scale or nanoparticles can include material that is either not inert or not classified as FDA accepted inert. Such particles can be coated with an inert coating, such as for example a commercial food grade surfactant. A possible added benefit of reacting small particles with one or more surfactants is the formation of a chemically activated surface that improves dispersion into the polymer matrix.

Figure 4:
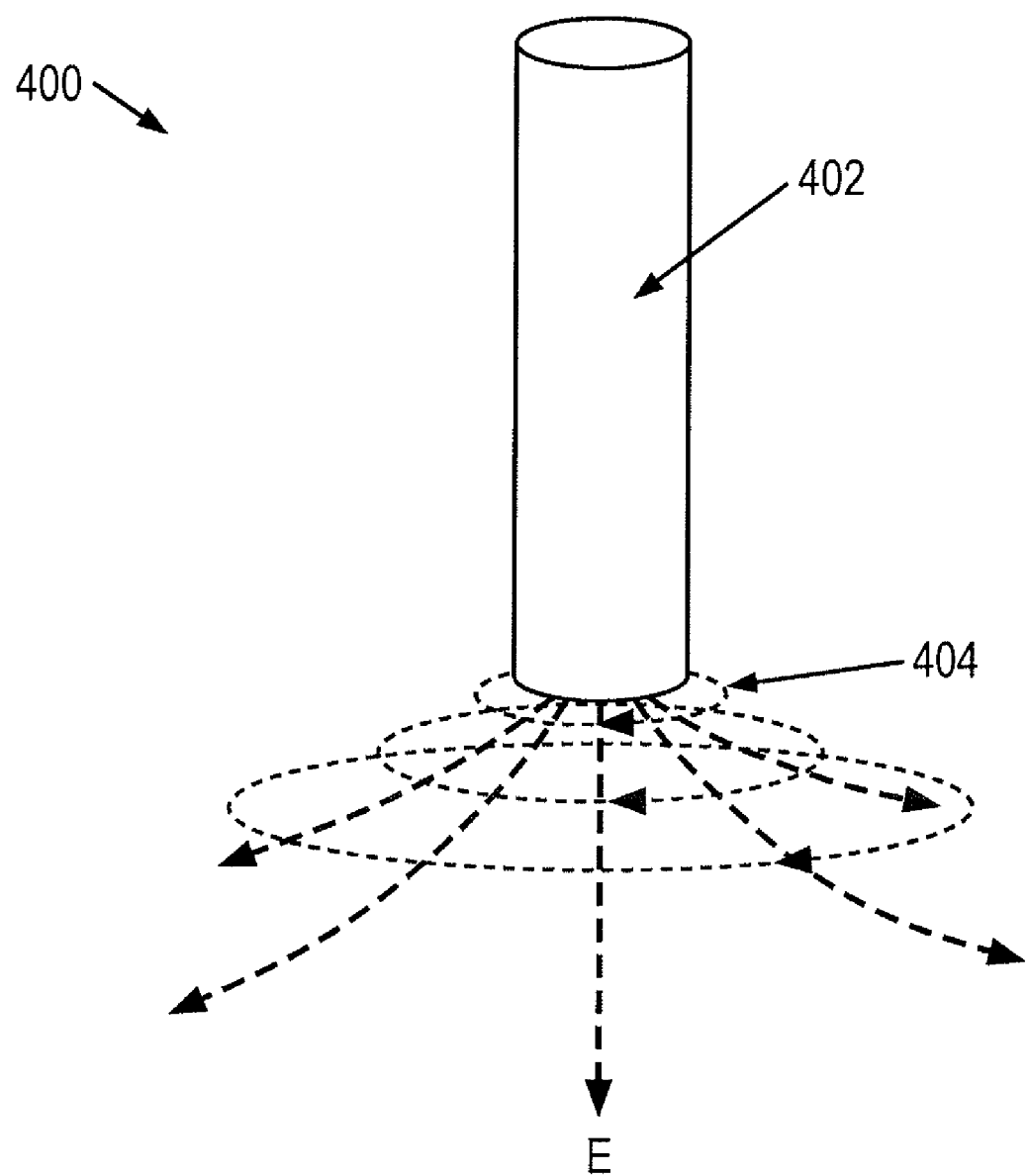
FIG. 4 is a diagram showing an example of a heterogeneous microwave emission rod.

In another possible variation, a heterogeneous microwave field can be applied to selectively deliver energy to the first weld region and the second weld region to create the aforementioned balancing of the melt-flow conditions on either side of the to-be-formed weld. The microwave field can be heterogeneous in either space or time. An example of the use of heterogeneous microwave fields to achieve targeted heat welding by delivering microwave energy only to or close to a desired weld location is shown in FIG. 4 which is a schematic diagram of a microwave energy delivery system 400 that illustrates the transmission of microwave energy along a rod 402. Microwaves are emitted from the tip 404 of the rod 402 as shown in the presence of the magnetic energy field vector as represented by the dotted ellipses (B). The direction of the electric field energy vector is shown by the dotted curved lines (E). Taken together, both of these electric and magnetic components constitute microwave energy. The focusing effect of the rod 402 and tip 404 geometry of the rod 402 causes the preferential microwave induced heating and chemical activation of only the polymer materials or solutions that are in the immediate vicinity of the metal rod 402.

Some polymer films include a deposited metal foil layer as a moisture and/or gas barrier. Because this metal foil can reflect microwave energy it can be advantageous to place such a film on the side of a flexible polymer film that opposes the side exposed to the tip end of a heterogeneous microwave emission rod 402 such as is shown in FIG. 4. The microwave energy emitted from the rod 402 or other microwave emitter is then absorbed by magnetic, ferromagnetic, and/or diamagnetic nanometer or micron-sized particles embedded as part of the chemical composition of the polymer in the structure of the film layer. The parts of the film layer that are not masked by a metal foil deposition preferentially receive and absorb the microwave energy. The embedded particle sizes and distributions can be chosen to absorb a desired balance of electric field and magnetic fields directed into the polymer packaging film. The thickness of the film, or alternatively the geometry of a molded component such as a fitment can require different combinations of electric and magnetic field vectors to achieve the desired effect, which can be a chemical polymerization reaction, a melt-flow, or the like. Both the chemical process and the physical process may be used to produce a hermetic heat seal.

The balance of electric and magnetic fields as well as the particle orientation and distribution can be modified to achieve desired effects when applying heterogeneous microwave activation to the substrate system. The frequency of microwave radiation can be varied to activate different sized particles and to activate (chemically or thermally or both) a desired process in a targeted part of the packaging assembly by proper selection of embedded particles and/or ionomer additives and by controlled variation of the delivered microwave energy. Particle size, composition, and/or orientation of the particles as well as the density of particles embedded within the polymer matrix can affect the rate at which microwave radiation at a given frequency is absorbed to deliver localized heating to the polymer component. Targeted heating can be achieved depending on the particle locations within the various components that are assembled to form the packaging.

Figure 5:
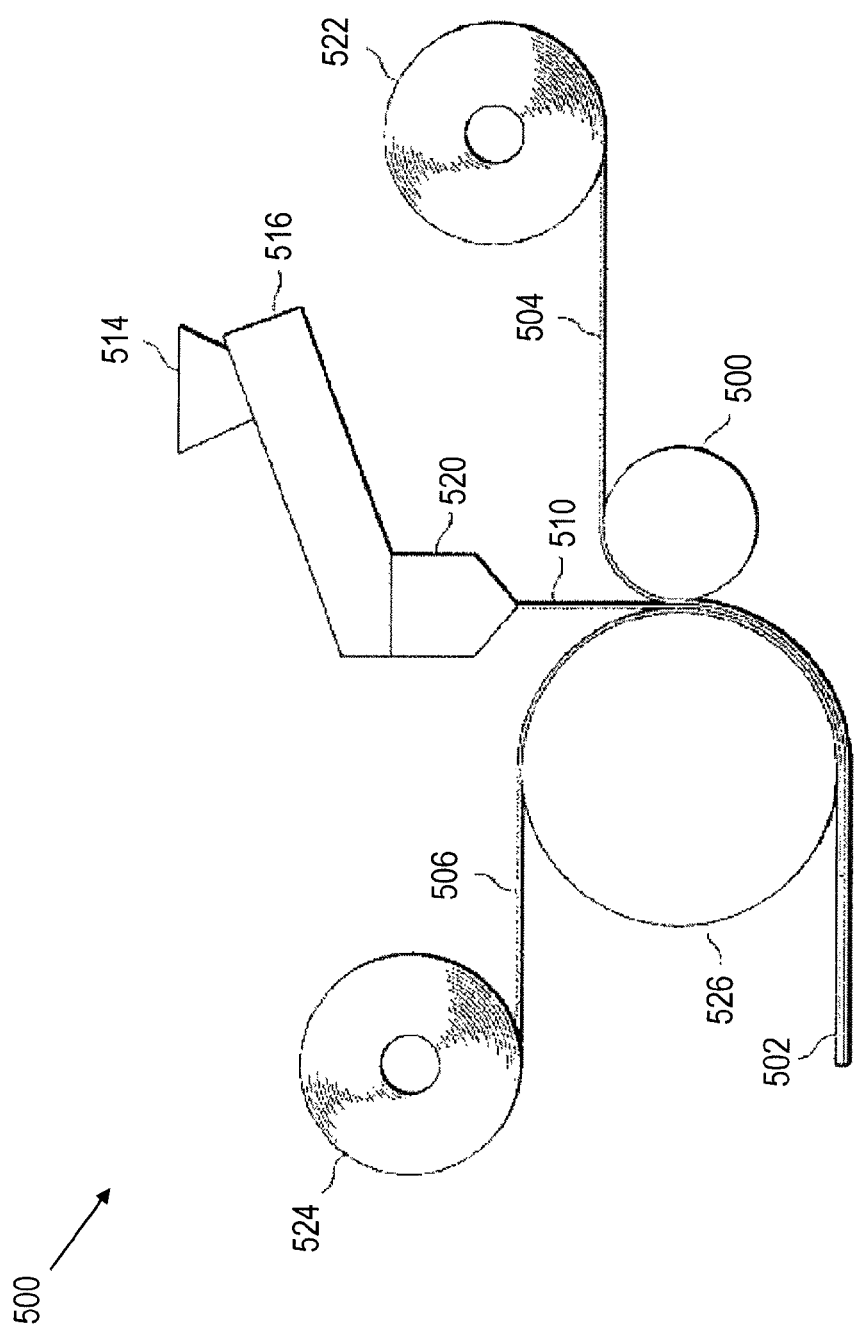
FIG. 5 is a diagram showing an example of an apparatus for creating patterns of additives within a polymer film.

The introduction of undesirable materials or solvents has been a limiting factor in the use of flexible packaging due to the restrictive requirements imposed by the US Food and Drug Administration (FDA) for substances approved for food contact. The current subject matter allows microwaves to act on dispersed micron or nano-sized particles to reduce polymer matrix viscosity and allow these packaging material components to flow and knit that polymer together to achieve hermetic seals. In some implementations, these types of seals can be printed into complex curvatures and in very reduced dimensions in a very short time using a process known as calendaring. A calender is a series of hard pressure rollers that smooth out the polymer into a thin film that can be printed and written on, and to increase the gloss on the surface. The polymer material can be dosed with the additives that act to improve weld performance in selected regions prior to the polymer material being formed into the thin film. In one example, a device 500 as shown in FIG. 5 can be used to apply additives arranged in a desired pattern within a film 502 of polymer that is formed by calendaring two starting film layers 504 506 into the final film 502. The additives 510 are delivered between the two starting film layers 504 506 from a dispenser apparatus 512 than can include an inlet 514, a storage volume 516, and a delivery nozzle 520 that directs the additives 510 to a desired location between the two starting film layers 504 506. To facilitate creation of a specific pattern of additives within the final film 502, one or more features for delivering additives at a chosen position along the width of the film normal to the plane of FIG. 5 can be included. For example, the delivery nozzle 520 can be movable along an axis normal to the plane of FIG. 5, can have a controllable outlet that starts and stops delivery of the additives 510, and/or can include one or more delivery outlets that are either fixed or movable along the axis normal to the plane of FIG. 5 The two starting film layers 504 506 can be delivered from film rolls 522 524 as shown in FIG. 5 or alternatively directly from a drawing or other manufacturing process that creates the two starting film layers 504, 506 to a calender apparatus that includes two or more rollers 526 that press the two starting film layers 504 506 into the final film 502 after the delivery nozzle 520 delivers the additives 510. An advantage of this patterning of the seal is to enable facile opening under mechanical shear by the end user, while maintaining the desired physical and chemical structures needed to maintain both barrier properties and biodegradability or ability to compost while also meeting the requirements for food contact and hermetic aseptic storage with significant economic advantages due to the speed of seal processing and the multifunctional and self-sterilizing application of microwaves.

Figure 6:
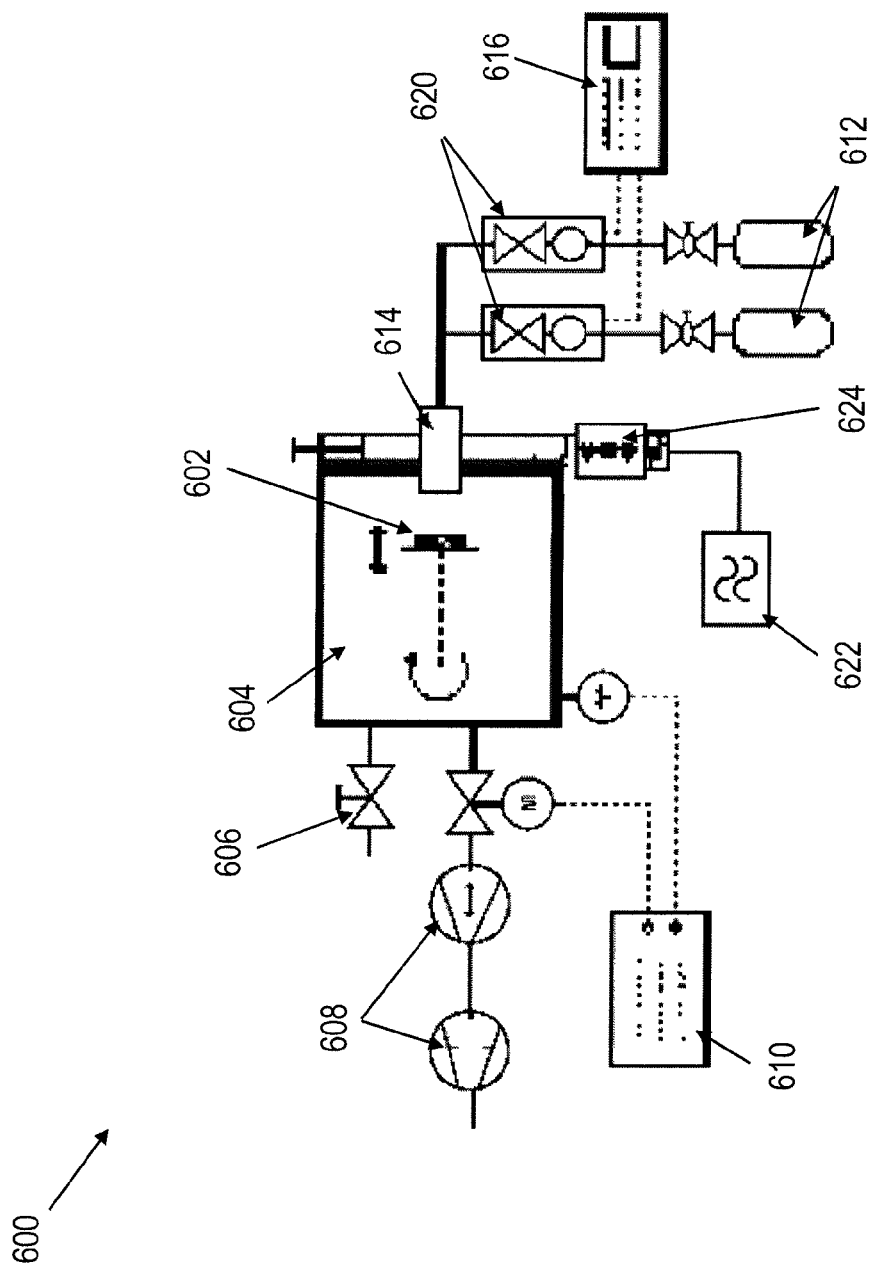
FIG. 6 is a box diagram illustrating a system for coating a flat sample substrate.

In another example, plasma polymerization can be used to deposit high quality permeation barrier coatings on polymer substrates. Several polymer film layers can be "stacked" to form multilayer coatings. The arrangement of the layers can be manipulated to create desired permeation properties. FIG. 6 shows a system 600 that can be used for the coating of a flat sample substrate 602 according to some implementations of the current subject matter. A vacuum chamber 604 contains the sample 602 and can be evacuated to a pressure of approximately 2-10 Pa. One or more valves 606, pumps 608, and a pressure controller unit 610 can be included to facilitate gas movement and maintain vacuum conditions within the chamber 604. Flow of one or more gas mixtures from gas reservoirs 612 to a plasma reactor 614 is controlled by a flow controller 616 and one or more flow controller valves 620. The gas molecules cross an area of high microwave intensity created by a microwave generator 622 and a wave guide 624 and are enhanced to a plasma state, in which the gas molecules are fragmented and activated. Particles from the plasma start to react and cross-link on the surface of the sample substrate 602 to form a thin layer. The layer formed in this way can display marked differences from conventional polymers due to the high energy plasma reactions and can exhibit unique surface properties. The coatings can have fundamental properties, such as a high degree of cross-linking, high density, good thermal and chemical resistance, freedom from micropores, and good adhesion to the bulk substrate of the sample substrate 602, even if the sample substrate 602 has a non-polar surface. These typical properties can make plasma polymerized coatings very useful as permeation barriers on plastic substrates.

PLA and other bio-polymers can have nanoparticle additives for reinforcement and as a catalyst for biodegradation. PLA alone is brittle and does not and can not maintain amorphous character when nanoparticles are added, because the high surface area of small solid particles causes significant crystallization and subsequent reduction of the ability to draw, deform, and work the material before failure. To compensate, more layers are produced to yield usable product for flexible film applications. The current subject matter can address this issue and provide substantial reductions in materials consumption. The amorphous state of a polymer film or molded component, which has fewer crystalline characteristics that can create points of mechanical weakness, can be used, and desired sealing properties can be achieved with the use of fewer material layers during the manufacturing process due to the type of nanoparticles embedded and the microwave irradiation of these nanoparticles.

In one variation, a fixed microwave frequency can be used to heat large micron-sized particles near the surface of a large or massive plastic fitment that naturally conducts away much of that heat through its thickness. At the same time, smaller sized particles absorbing less of that same frequency are heated in a packaging film placed in abutment to that same fitment. The thin film heats rapidly due to the relatively smaller thickness of a film, as the thermal energy emitted by activated particles has less material into which to transfer that heat. Thus, a thermal balance can be achieved to target the different mass balances in the geometry of the flexible foil and the fitment, therefore allowing facile and rapid knitting of the interface in contact between the foil and the fitment.

In another variation, a variable microwave frequency can be used to activate particles, possibly including but not limited to nanoparticles, dispersed within the surface of the further of two films placed in compression under the tip end of a microwave emission rod device 400, such as for example that shown in FIG. 4. At this same time, smaller sized particles absorbing less of that same frequency are being heated less in some areas of both packaging films placed in abutment. The frequency of the applied microwave irradiation is then varied in a continuous, cyclic manner such that differently sized particles in the polymer matrix materials become activated by the device. In this manner, unequally sized particles each in their turn contribute to the thermal or chemical activation of the polymer matrix under the heterogeneous microwave irradiation device. A thermal balance can be achieved to target the different particle distributions or orientations which are present in the geometry of the two films, and therefore allow facile and rapid hermetic knitting of the interfaces placed in abutting contact.

In another variation, differences in microwave heating that depend on the dielectric properties of the polymer matrix materials can be exploited using a variable microwave frequency to preferentially activate the polymeric material of the further of two films placed in compression under the tip end of the microwave emission rod device. At this same time, a polymer matrix material of different chemical composition and therefore dielectric properties can absorb less of that same frequency, even though both packaging films are placed in abutment with each other. The frequency of the applied microwave irradiation is then varied in a continuous, cyclic manner such that the first film is preferentially activated. In this manner, two materials of unequal dielectric properties may each in their turn contribute to the thermal or chemical activation of the polymer matrices at their interface while under irradiation from the heterogeneous microwave irradiation device. A thermal balance can be achieved to target the different thermal responses which are present in the two films, and therefore allow facile and rapid hermetic knitting of the unlike interfaces placed in abutting contact.

In another variation, particles, including but not limited to nanoparticles, can be added to the composition of a first piece of polymer matrix material and not to a second piece to which the first piece is to be welded of different dielectric property, such that the two chemically dissimilar materials are better matched in their dielectric properties. This better match allows both dissimilar materials to be joined or formed in abutment to create seams, welds, or other continuous interfaces. This synergy between the joining process and the composition of the polymer matrix materials readily allow otherwise incompatible materials to be joined using the currently disclosed subject matter.

In another variation, particles, including but not limited to nanoparticles, with a size distribution that favors at least one size (diameter) or range of sizes are added to a first polymer film or part. These particles are selected to interact best with the microwave device of this invention by impedance-matching. A second polymeric material of different chemical composition has added to it some of the same kind of particles, but in a different concentration to achieve the same impedance matching. This approach allows two polymer materials having different dielectric, thermal, and/or chemical properties to be joined or formed in abutment to create seams, welds, or other sealed, continuous interfaces. The synergy between the joining process and the composition of polymer matrix materials again allow otherwise incompatible materials to be joined.

In another variation, particles, including but not limited to nanoparticles, of high aspect ratio can be oriented in a film by a melt-flow process, a drawing process, and/or a chemical process that creates a non-random or otherwise ordered orientation of particles in the polymer matrix. This distribution by orientation allows microwaves of one polarization to favor impedance matching with the irradiating microwave field. A first film can be created to preserve this favorable particle orientation to the applied microwave field. A second such film can be placed in planar abutment but with the particles oriented at an approximately 90° angle to those in the first film. The polarization of the irradiating microwave fields can be oriented first to align with the particles in the first film and then with the particles in the second film, thereby causing sequential activation of the two films that are welded. The re-orientation of the microwave field can optionally be achieved by turning the films, turning the microwave emitter device, or by a combination of these two techniques. In addition, different angles can be used, and different numbers of films or fitments can be incorporated, depending on the amount of activation desired, the timing or duration of that activation, and the physical location of the desired activation in the assembly of the film or packaging structure to be welded, joined, formed, or deformed on the application of force required to cause the assembly to achieve a desirable shape or configuration.

In another variation, particles, including but not limited to nanoparticles, can be added and well dispersed in a liquid or semisolid mixture of polymer. In one example, the polymer can poly lactic acid (PLA), and the nanoparticles can be commercially available organic-substituted (ion-exchanged) montmorillonite nanoclay additives. This example can be particularly environmentally and ecologically beneficial. A slurry of the mixture that includes monomeric or viscous, partly cross-linked, lactic acid material can then be roll-coated onto a previously prepared film of PLA which already has a very high cross-link density to achieve excellent barrier properties and good tensile strength. The microwave cross-section in the slurry can be selected to be greater than that normally achieved in the same amount of PLA sheet, so that activation more favorably happens in the slurry region rather than in the PLA films, even after accounting for attenuation effects as the microwaves pass through the PLA films. Delivery of focused heterogeneous microwaves allows activation of the slurry to cross-link it to both itself and to one or more abutting PLA sheets onto which it is physically compressed. The irradiating microwave field generated by the device of the present invention then glues the adjoining PLA layers together to establish a hermetic seal between sandwiched PLA sheets.

In one example of a manufacturing process according to the current subject matter, a template is made with a ring of exposed ends of wires normal to the plane of the ring. The template is made to approach two sheets of flexible film having that are prepared according to one of the examples described above or otherwise according to the current subject matter. Pressure is applied between the sheets of flexible film. Microwave energy is inducted into the wires such that the substrate flexible film is heated at or near the tips of the wires which are close to but not into direct contact with the films. The template is spun about its axis so that microwave energy is distributed all along the circumference of the region of the template where a join is desired. The template is removed, and the circular weld or join is allowed to cool and form a hermetic seal. The surface on the far side of the two films supports those films and the template. This support surface can in some variations be ultrasonically activated to assist the weld operation. Nanoparticles or other additives within the finished packaging materials can also act as nucleation sites to make bio-compostable polymers degrade more efficiently.

Polymers in accordance with the current subject matter can be made into a film by web casting, extrusion, rolling and calendering, or other sheet-forming process. Layers of other polymeric materials, or alternatively of aluminum vapor can be added or deposited upon the polymer films to enhance liquid or gas barrier properties. It can be advantageous to minimize or eliminate non-biocompostable alternatives. Packages such as those described herein can be designed to be foldable or substantially flat and stackable when empty of desired contents.

The implementations set forth in the foregoing description do not represent all implementations consistent with the subject matter described herein. Instead, they are merely non-limiting examples consistent with aspects related to the described subject matter. Although a few variations have been described in detail above, other modifications or additions are possible. In particular, further features and/or variations may be provided in addition to those described. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other examples, variations, and implementations may be within the scope of the following claims.

What is claimed:

1. A method comprising:
preparing a first weld location on a first polymer piece by adding one or more first additives that selectively affect first dielectric properties of the first weld location, the one or more first additives comprising nanoparticles;
imposing an ordered orientation of the nanoparticles in the first weld region;
applying pressure to bring the first weld location into abutment with a second weld location on a second polymer piece, the second weld location having second dielectric properties;
delivering microwave energy to the first weld location and the second weld location in a controlled manner to promote a first microwave absorbance in the first weld location that is governed by the first dielectric properties and a second microwave absorbance in the second weld location that is governed by the second dielectric properties, the first microwave absorbance generating a first melt-flow condition in the first weld location that is compatible with a second melt-flow condition generated in the second weld location by the second microwave absorbance, the microwave energy comprising a polarization that is preferentially absorbed by the nanoparticles in the ordered orientation; and
creating a welded seam joining the first weld region to the second weld region.

2. A method as in claim 1, further comprising: preparing the second weld location on the second polymer piece by adding one or more second additives that selectively affect the second dielectric properties.

3. A method as in claim 2, wherein:
the one or more first additives comprises particles of a first particle size having a first composition and present in a first concentration;
the one or more second additives comprises particles of a second particle size having a second composition and present in a second concentration; and
wherein the first and second particle sizes, the first and second compositions, and the first and second concentrations are selected to impart the first weld location and the second weld location with similar microwave radiation absorbance properties.

4. A method as in claim 1, wherein the one or more first additives comprise at least one of: particles of a first particle size having a first composition and present in a first concentration being selected to impart the first weld location with similar microwave radiation absorbance properties to the second weld location; hermatite; iron carbide; a carbide; and an ionomeric material.

5. A method as in claim 1, wherein the imposing of the ordered orientation of the nanoparticles in the first weld region comprises one or more of a melt-flow process, a drawing process, and a chemical process.

6. A method as in claim 1, wherein the first polymer piece comprises at least one of a flexible film and biodegradable poly-lactic acid (PLA), and the second polymer piece comprises a molded device.

7. A method as in claim 1, wherein the second polymer piece comprises a fitment and the first polymer piece comprises a flexible film that forms a sealed pouch to which the fitment is attached to provide access to contents stored within the pouch.

8. A method as in claim 1, further comprising applying ultrasonic energy to the first and the second weld regions to enhance the creating of the welded seam.

9. A method comprising:
applying pressure to bring a first weld location on a first polymer piece into abutment with a second weld location on a second polymer piece, the first weld location having first dielectric properties, and the second weld location having second dielectric properties;
delivering microwave energy to the first weld location and the second weld location in a controlled manner to promote a first microwave absorbance in the first weld location that is governed by the first dielectric properties and a second microwave absorbance in the second weld location that is governed by the second dielectric properties, the first microwave absorbance generating a first melt-flow condition in the first weld location that is compatible with a second melt-flow condition generated in the second weld location by the second microwave absorbance, the delivering microwave energy to the first weld location and the second weld location comprising at least one of applying a heterogeneous microwave field that is more strongly absorbed in the first weld region than in the second weld region; and sequentially applying a microwave field having at least a first frequency and a second frequency, the first frequency being more strongly absorbed in the first weld region and the second frequency being more strongly absorbed in the second weld region; and
creating a welded seam joining the first weld region to the second weld region.

* * * * *